(12) United States Patent
Hamman et al.

(10) Patent No.: US 6,563,456 B1
(45) Date of Patent: May 13, 2003

(54) FLEXIBLE WAVE GUIDE JOINT

(75) Inventors: Gary M. Hamman, Scottsdale, AZ (US); Doug W. Taylor, Tempe, AZ (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 09/971,340

(22) Filed: Oct. 4, 2001

(51) Int. Cl.[7] ................................................ G01S 13/00
(52) U.S. Cl. ............................ 342/175; 342/70; 342/71; 342/72; 342/158; 343/770; 343/767; 343/757
(58) Field of Search ............................. 342/70–72, 175, 342/158; 343/770, 767, 757

(56) References Cited

U.S. PATENT DOCUMENTS

| | | | | |
|---|---|---|---|---|
| 4,625,188 A | | 11/1986 | Bourgie | 333/257 |
| 4,800,389 A | * | 1/1989 | Reger et al. | 342/158 |
| 5,311,200 A | * | 5/1994 | Walker et al. | 333/248 |
| 5,455,589 A | * | 10/1995 | Huguenin et al. | 342/175 |
| 5,511,238 A | * | 4/1996 | Bayraktaroglu | 455/81 |
| 5,781,087 A | | 7/1998 | Milroy et al. | 333/257 |
| 6,172,648 B1 | * | 1/2001 | Tanizaki et al. | 343/753 |
| 6,249,242 B1 | * | 6/2001 | Sekine et al. | 342/70 |

\* cited by examiner

*Primary Examiner*—Thomas H. Tarcza
*Assistant Examiner*—Isam Alsomiri
(74) *Attorney, Agent, or Firm*—Rader, Fishman & Grauer PLLC

(57) ABSTRACT

A flexible wave guide joint is located between a transceiver and oscillating antenna in a vehicular collision warning system. The flexible joint includes a multiple portion wave guide feed. One portion of the wave guide feed is fixed in position and coupled to the transceiver while another portion of the wave guide feed is coupled to the moving antenna. The wave guide feed portions are separated by an air gap to permit oscillation of the antenna relative to the transceiver.

8 Claims, 4 Drawing Sheets

FLEXIBLE WAVE GUIDE JOINT

BACKGROUND OF THE INVENTION

This invention relates to an improved wave guide for any mechanically scanned antenna and, more particularly, to a flexible wave guide joint which is more reliable than prior constructions.

The present construction is directed towards a motor vehicular collision warning system which includes a scanned beam sensor, a signal processor, and a vehicle interface system that initiates warnings to the driver or adaptively controls the vehicle. In this forward looking collision warning system, the sensor is designed to project a narrow beam of energy toward objects in the forward field of view. A forward collision warning control of this type for a vehicle can require a unit life in excess of two hundred million cycles at temperatures ranging from −40° to 100° C. Thus, reliability requirements are high and unit costs must be low.

Due to their weight and bulk, it is not practical to place a transceiver of a radar system on the moving mass of a rotated antenna in a motor vehicular collision warning system. Nevertheless, it is important that an efficient low loss microwave frequency connection be achieved in order to ensure adequate overall system performance. In certain prior constructions, a wave guide rotary joint has been used to achieve the coupling function.

Prior wave guide rotary joints are bulky and expensive. Some require full 360° rotation. Further, while a rotary joint has reasonably good electrical performance at microwave frequencies, its performance at millimeter wave frequencies, especially higher than 40 GHz is not satisfactory, i.e., greater than 1 dB of insertion loss and variation of performance with rotation. A rotary joint is also expensive due to precision machined parts and bearings. Moreover, the reliability of rotary joints is marginal in systems requiring a very high number of rotations.

Therefore, it is an objective of the present invention to provide a flexible wave guide joint that has improved electrical performance, is less costly to produce, and is more reliable than prior constructions such as a rotary joint.

SUMMARY OF THE INVENTION

In accordance with this invention, a radar apparatus is provided with a low loss coupling between wave guides that is flexible in angular position. A rotatable slotted wave guide antenna is driven to oscillate back and forth at a small angle. A transceiver is coupled to a first wave guide portion that is held in a fixed position with an open end facing a second wave guide portion also having an open end. A small air gap exists between the open ends of the two wave guide portions wherein the air gap varies with angular rotation of the non-fixed wave guide portion.

The initial position for the moveable wave guide portion is with its longitudinal axis coincident with the fixed wave guide longitudinal axis. The air gap between the two wave guide portions is small thereby providing for low insertion loss. As the moveable wave guide angularly rotates, the gap between the open end walls of the two wave guide portions varies. The maximum angular rotation between the wave guide portions is limited by the gap between the open end walls. For a maximum angle, the wave guide portions should be positioned so that the air gap varies between the walls that are closest together. Thus, the present invention provides a wave guide coupling which allows angular motion between two wave guide portions with minimal effort and without bending or sliding parts that would result in performance degradation in use.

A small air gap is needed to keep the insertion loss of the joint to a minimum. The minimum air gap is determined by preventing the walls of the wave guide portions from butting into each other at a maximum angular rotation. With the present construction, there is no need for dielectric or other spacers in the air gap region. Further, no chokes or mode suppressors are required to obtain the low insertion loss.

Thus, in one embodiment of the invention, a wave guide antenna is provided which includes a center feed with a plurality of slotted apertures to pass transmitted and reflected radar signals to and from the target. A two-part wave guide feed is also provided with one part of the wave guide feed being coupled to the transceiver. This wave guide portion is also fixed relative to the other wave guide feed portion. The other portion of the wave guide feed is integral with the antenna and is separated from the first portion by the previously described air gap. When the antenna is oscillated, the moveable wave guide feed portion rotates angularly relative to the fixed wave guide feed portion.

The foregoing and other advantages and features of the invention will be more apparent from the following description when taken in connection with the accompanying drawings.

DETAILED DESCRIPTION OF A PREFERRED EMBODIMENT

Figure 1:
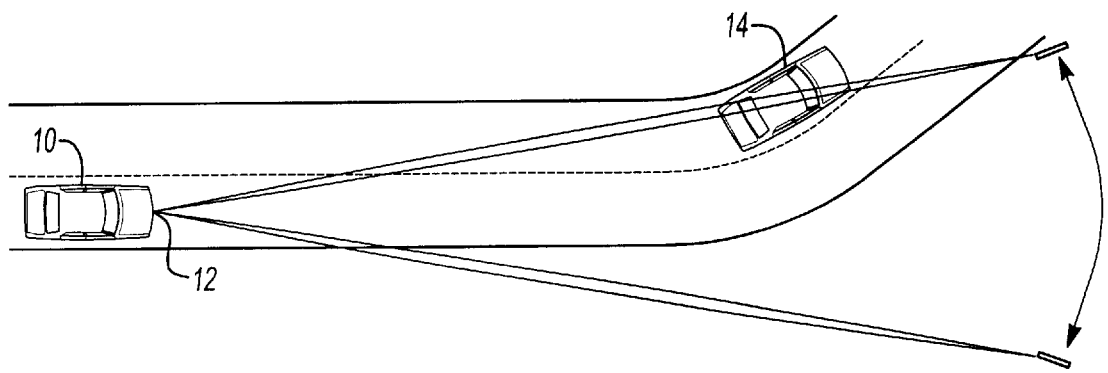
FIG. 1 is an illustration of one embodiment of an environment wherein the present invention may be used.

FIG. 1 illustrates one embodiment of an environment in which the present invention is useful. A traveling vehicle 10 has a vehicular collision warning system 12 mounted at a front portion of the vehicle body. The collision warning system emits a forward signal, such as a radar wave, from the vehicle and also receives a reflected wave from an obstacle, such as another vehicle 14, which is driving towards or away from vehicle 12. The collision warning system measures the distance between the traveling vehicle 10 and the other vehicle 14. If the system detects an object in front of the traveling vehicle, it automatically activates an alarm or adaptively controls the vehicle by, for example, activating a brake to supply a braking force to the vehicle's wheels.

Thus, the vehicular collision warning system notifies the driver of an impending collision or initiates evasive action to avoid a collision or actively adjusts the vehicle speed to maintain a time headway to the closest in path object. Warnings may be visual, auditory, or tactile and the vehicle control actions may include braking, throttle control, transmission control and evasive steering.

Figure 2:
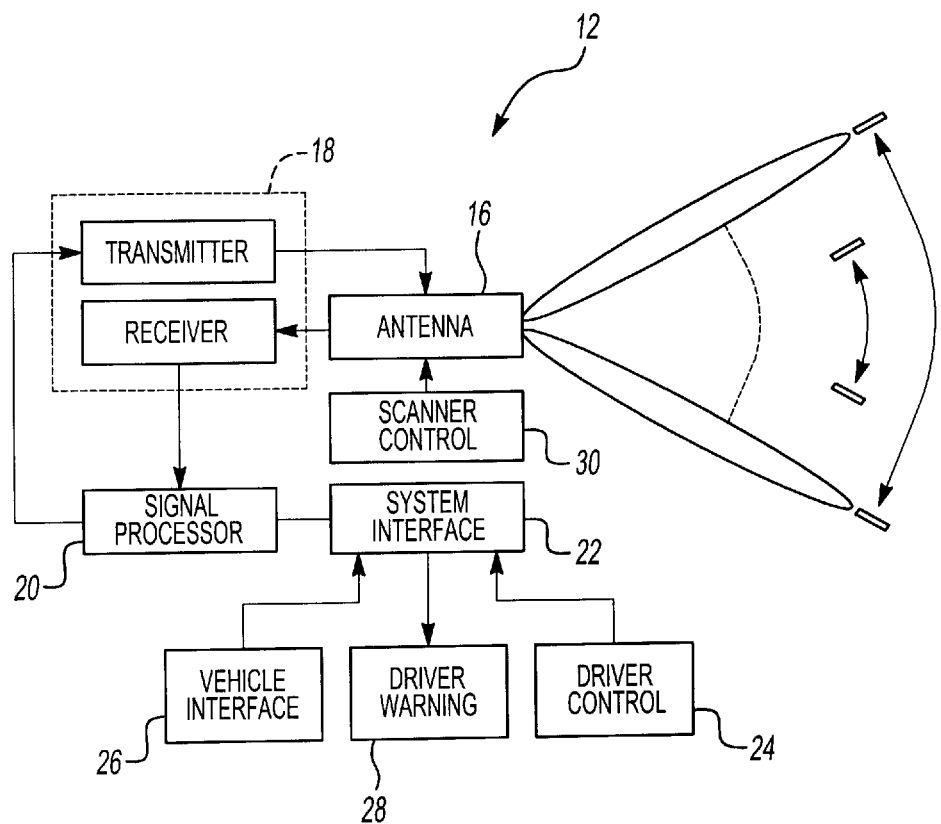
FIG. 2 is a schematic block diagram of a vehicular collision warning system which includes the present invention.

Referring now to FIG. 2, the forward looking collision warning system 12 of the present invention is provided with a rotatable antenna structure 16 which may be in the form of a slotted wave guide antenna. In one preferred embodiment, the antenna 16 is driven to oscillate back and forth at a small angle, for example 10°, in each direction. A transceiver 18 is coupled to the antenna and the antenna passes transmitted and reflected radar signals to and from a target as it is oscillated back and forth. The scanned signals are directed to a processor 20 and then to a system interface 22 which receives input from a driver control 24 and a vehicle interface 26. The outputs from the system interface 22 are directed to a driver warning or adaptive control 28 as well as to the scanner control 30.

Figure 3:
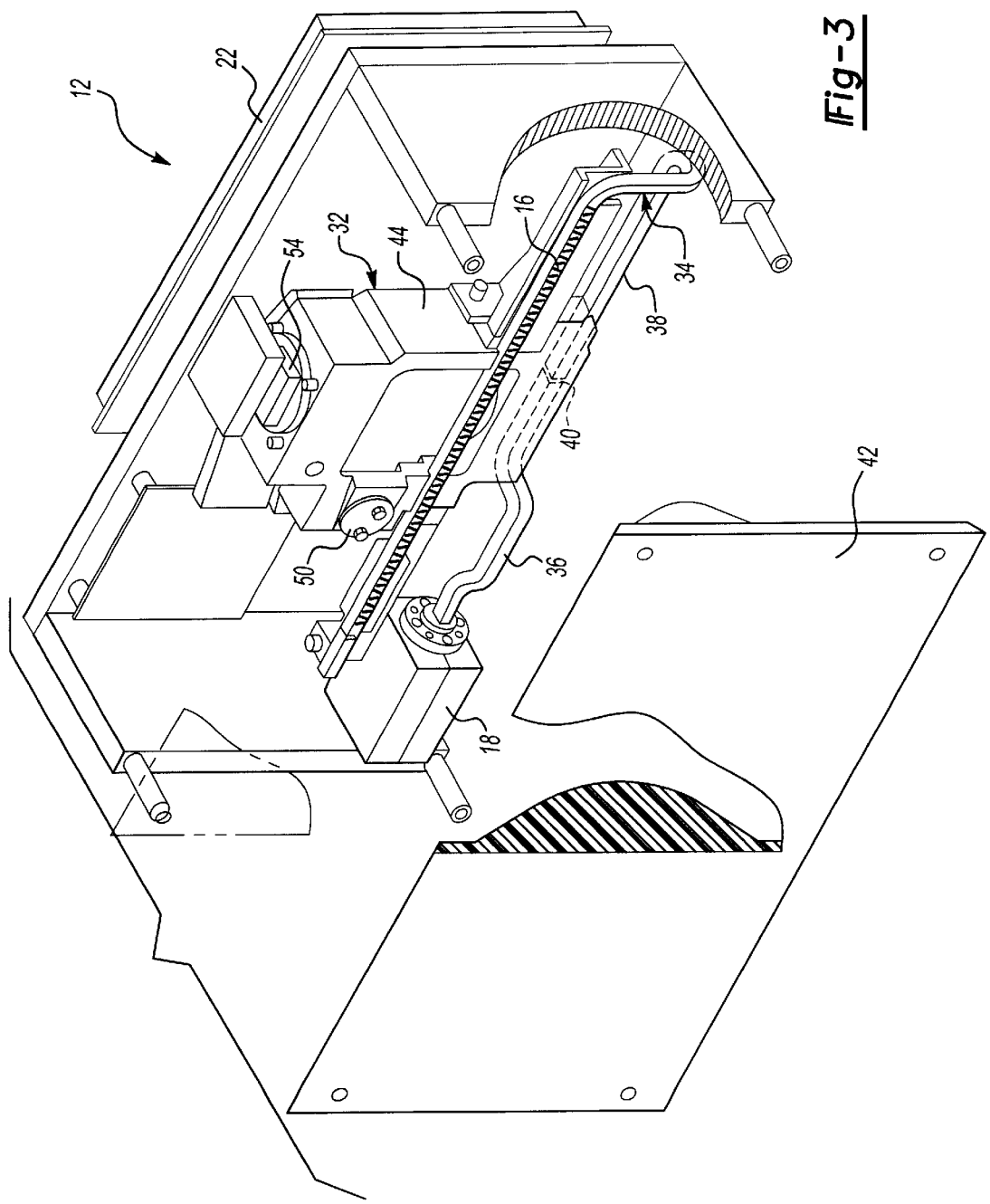
FIG. 3 is a perspective view of one embodiment of a vehicular collision warning system incorporating the teachings of the present invention.

The motor vehicular collision warning system 12 is shown in more detail in FIG. 3. It includes the transceiver 18, an antenna scanner assembly 32, and a rotatable wave guide assembly 34. As will be described in more detail, an antenna portion 16 of the wave guide assembly 34 is driven to oscillate back and forth at a small angle in each direction. The transceiver 18 is coupled to the wave guide feed portion 36, and the wave guide assembly passes transmitted and reflected radar signals to and from a target as it is oscillated back and forth. The scanned signals are then directed to the processor 20 and then to a system interface 22 for initiating warnings to the driver or adaptively controlling the vehicle.

The wave guide antenna 16 is rectangular in cross section and includes a feed with a plurality of slotted apertures to pass transmitted and reflected radar signals to and from a target. The angles of inclination of successive slots are predetermined and calculated to give a desired aperture amplitude distribution that determines the radiation pattern. The spacings between the slots are determined to properly phase the energy radiated by the slots.

Another portion 38 of the wave guide is integrally formed with the antenna 16. Wave guide portions 36 and 38 are separated from each other by an air gap 40. The wave guide antenna 16 is mounted to the rotatable scanner assembly 32 such that it may be oscillated back and forth at a small angle in each direction. The small air gap 40 allows relative angular movement between the wave guide antenna 16 and the fixed wave guide portion 36.

Figure 5:
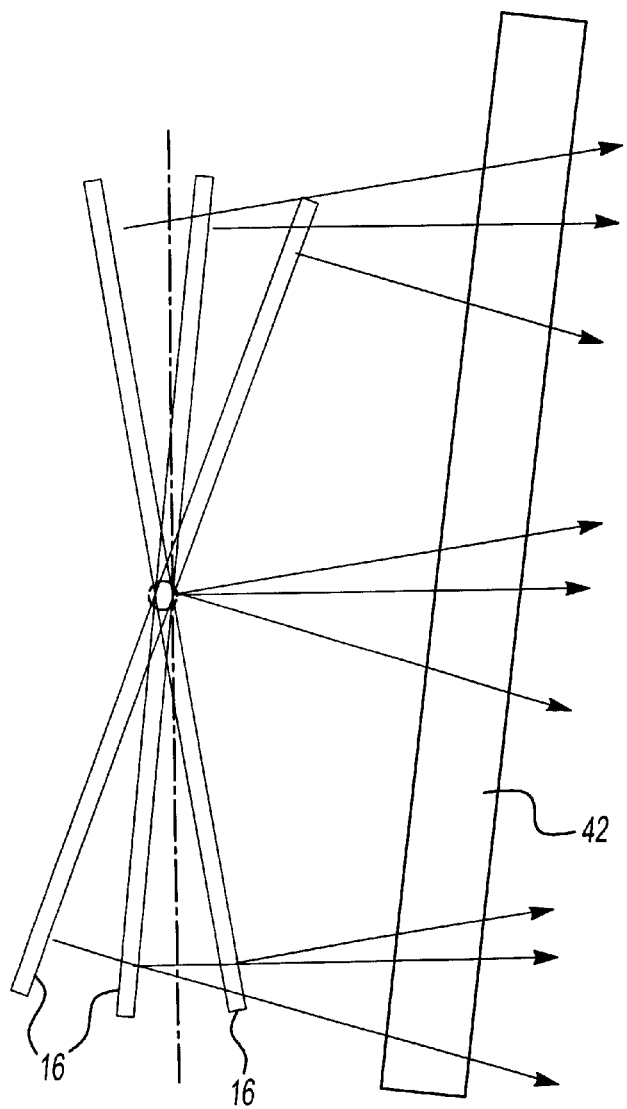
FIG. 5 is a schematic illustration of a rotatable antenna for the radar apparatus wherein the antenna is driven to oscillate for emitting and receiving radar waves.

FIG. 5 schematically illustrates the oscillation of antenna 16. As shown, antenna 16 passes transmitted and reflected radar signals through its slotted apertures to and from a target as it is oscillated back and forth. The signals are passed through a lens 42 which is positioned in front of the oscillating antenna 16. As described previously, the scanned signals are directed to a processor and then to a vehicle interface system for initiating warnings to the driver or adaptively controlling the vehicle.

Referring again to FIG. 3, the wave guide scanner assembly 32 is an electromechanical mechanism consisting of a moving support 44 with one end mounted by way of a spring flexure device (not shown) to a stationary chassis and another portion mounting the scanning antenna 16. The drive assembly for the moving support is magnetic and has no contacting components. A coil and magnet assembly 50 drive the moving support 44 when positive and negative DC current is applied to the coil which results in oscillating movement of the moving support 44. A position sensor 54 on the scanner 32 provides feedback for determining impulse timing, duration, and amplitude of electrical impulses to the scanner assembly 32.

Figure 4:
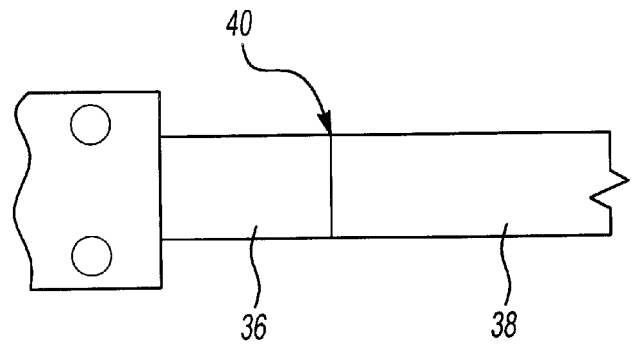
FIG. 4 is a detailed view of the air gap between the antenna and wave guide feed.
Figure 6A:
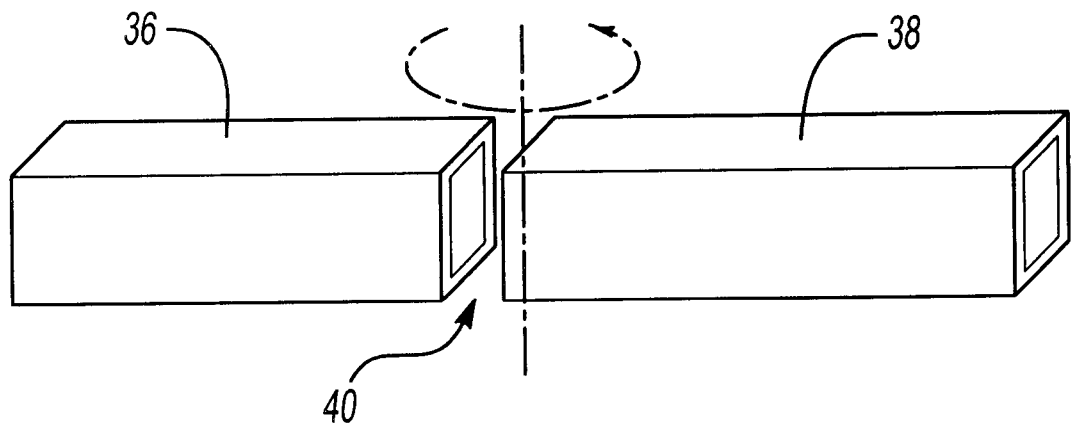
FIG. 6A is a further illustration of the flexible wave guide joint.
Figure 6B:
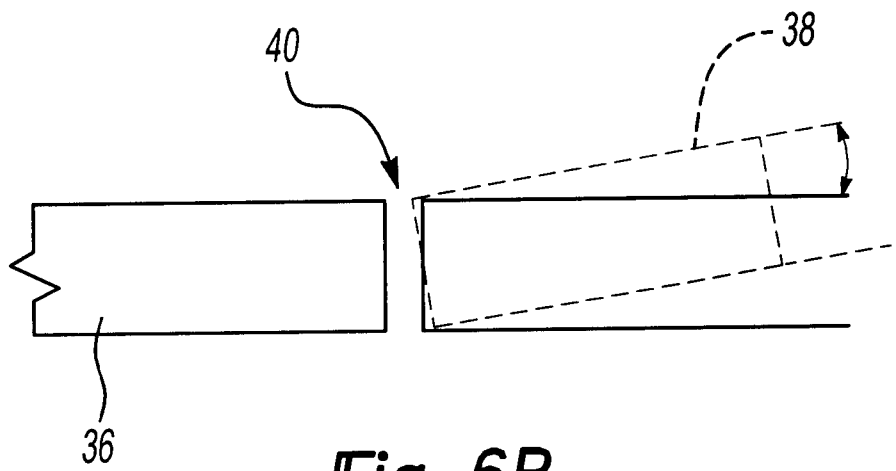
FIG. 6B is a plan view of the wave guide joint showing angular movement.

FIG. 4 is a more detailed view of the flexible wave guide joint between wave guide portions 36 and 38. When FIG. 4 is taken in combination with FIGS. 6A and 6B, it is apparent that the initial position for the moveable wave guide portion 38 is with its longitudinal axis coincident with the longitudinal axis of the fixed wave guide 36. The air gap 40 between the two wave guide portions 36 and 38 is small thereby providing for low insertion loss. As the moveable wave guide 38 angularly rotates, the gap between the open end walls of the two wave guide portions 36 and 38 varies.

The maximum angular rotation between the wave guide portions 36 and 38 is limited by the gap 40 between the open end walls. For a maximum angle, the wave guide portion should be positioned so that the air gap 40 varies between the walls that are closest together. A small air gap is needed to keep the insertion loss of the joint to a minimum. The minimum air gap is determined by preventing the walls of the wave guide portions from butting into each other at a maximum angular rotation. With the present construction, there is no need for dielectric or other spacers in the air gap region. Further, no chokes or mode suppressors are required to obtain the low insertion loss.

The preferred orientation of the pivot axis between the wave guide portions 36 and 38 (shown in FIG. 6A), is parallel to the widest cross-section dimension of the wave guides so that the air gap 40 is minimum for a given amount of angular rotation of the wave guides. To increase the maximum angular rotation of the wave guides without increasing the gap 40, the walls of the wave guides can be chamfered or rounded.

Thus, a wave guide antenna is provided which includes a feed with a plurality of slotted apertures to pass transmitted and reflected radar signals to and from a target. A two-part wave guide feed is provided with one part of the wave guide feed being coupled to the transceiver 18. This wave guide portion 36 is also fixed relative to the other wave guide feed portion 38. Wave guide feed 38 is integral with the antenna 16 and is separated from the first wave guide portion 36 by the flexible wave guide joint 40. When the antenna 16 is oscillated, the moveable wave guide feed portion 38 rotates angularly relative to the fixed wave guide feed portion 36 as a result of the flexible wave guide joint 40. Flexible joint 40 has low insertion loss, no friction, no contacting parts that rotate or slide, and no bending parts. It is simple and economical to construct and can be used at high mechanical scan rates. Moreover, it is very durable and reliable since there are no contacting moving parts.

As will be understood by those of skill in the art, the sensing system of the present invention includes a low mass antenna that is scanned at a small angle with low power requirements. This provides a more efficient use of radio frequency energy which allows the sensing system to see targets that are further away than was heretofore possible.

It is to be understood that the above-described embodiment is merely illustrative of one embodiment of the principles of the present invention. Other embodiments can be devised by those skilled in the art without departing from the scope of the invention.

What is claimed is:

1. A sensing system including:
   (a) an oscillating scanning antenna;
   (b) a transceiver coupled to said scanning antenna for transmitting radar signals to a target and for receiving reflected radar signals from a target as said scanning antenna is oscillated; and (c) a multiple piece wave guide feed, including a first portion of the wave guide feed that is fixed and a second portion of the wave guide feed that is connected to the scanning antenna;

(d) wherein the first portion of the wave guide feed and the second portion of the wave guide feed are separated by an air gap that allows angular movement between the scanning antenna and the fixed portion of the wave guide.

2. The sensing system of claim 1 wherein one portion of the wave guide feed is fixed and another portion of the wave guide feed is connected to the scanning antenna with the portions of the wave guide feed being separated by an air gap.

3. The sensing system of claim 1 wherein the scanning antenna is driven to oscillate in an angular motion.

4. The sensing system of claim 3 wherein the scanning antenna passes transmitted and reflected scanned signals to and from a target as it is oscillated and wherein the scanned signals are directed through a processor to a driver warning or adaptive control system.

5. The sensing system of claim 4 wherein the scanning antenna is slotted and rectangular in cross-section and includes a feed with a plurality of slotted apertures to pass transmitted and reflected radar signals to and from a target.

6. A sensing system including:

(a) a multiple portion wave guide feed;

(b) a transceiver with one portion of the wave guide feed being coupled to the transceiver;

(c) an oscillating antenna coupled to another portion of the wave guide feed; and (d) an air gap separating the portions of the wave guide feed to form a flexible wave guide joint between the transceiver and oscillating antenna;

(e) wherein the flexible wave guide joint permits relative angular movement between the one portion of the wave guide feed coupled to the transceiver and the other portion of the wave guide feed coupled to the oscillating antenna.

7. The sensing system of claim 3, wherein the oscillation of the scanning antenna is limited to a small angle.

8. The sensing system of claim 1, wherein the size of the air gap varies as angular movement occurs between the scanning antenna and the fixed portion of the wave guide.

\* \* \* \* \*